United States Patent

[11] 3,559,928

| [72] | Inventor | Elroy Dohmeyer<br>11242 N. Cedarburg Road, Mequon, Wis. 53092 |
|---|---|---|
| [21] | Appl. No. | 843,512 |
| [22] | Filed | July 22, 1969 |
| [45] | Patented | Feb. 2, 1971 |

[54] AVIATION WINDSHIELD PROTECTIVE DEVICE
2 Claims, 4 Drawing Figs.

[52] U.S. Cl. .................................................. 244/121,
105/456, 244/129, 296/91
[51] Int. Cl. ................................................. B64c 1/14
[50] Field of Search ............................................ 244/121,
129W; 296/91; 105/456; 52/(Consulted);
15/(Consulted)

[56] References Cited
UNITED STATES PATENTS

| 2,849,760 | 9/1958 | Boeke et al. ................ | 244/121 |
| 2,905,504 | 9/1959 | McMullen .................... | 244/121 |
| 3,289,060 | 11/1966 | Rubin .......................... | 244/121 |
| 3,151,826 | 10/1964 | Michel ......................... | 244/115 |

*Primary Examiner*—Milton Buchler
*Assistant Examiner*—Steven W. Weinrieb
*Attorney*—Gerald P. Welch ABSTRACT: A plurality of sheet transparencies covering a portion of an airplane windshield and means for successively divesting each sheet element beginning with the outermost.

PATENTED FEB 2 1971  3,559,928

INVENTOR
ELROY DOHMEYER
BY Gerald P. Welch
ATTORNEY

AVIATION WINDSHIELD PROTECTIVE DEVICE

BACKGROUND OF THE INVENTION

Airplanes are provided with usual means for clearing of windshields such as wipers and spraying of liquid. An infrequent but very serious hazard results when a swarm of insects collect on a windshield in such quantity as to completely obscure the vision of the pilot. In such cases the wiper and liquid means may be entirely ineffective.

It is an object of the present invention to provide a plurality of transparent sheets covering a portion of the plane windshield, provided with compressed air means for tearing off each sheet in succession as may be necessary during the passage of the plane through a swarm of insects sufficient to obscure the windshield.

DESCRIPTION OF THE PREFERRED EMBODIMENTS

Figure 1:
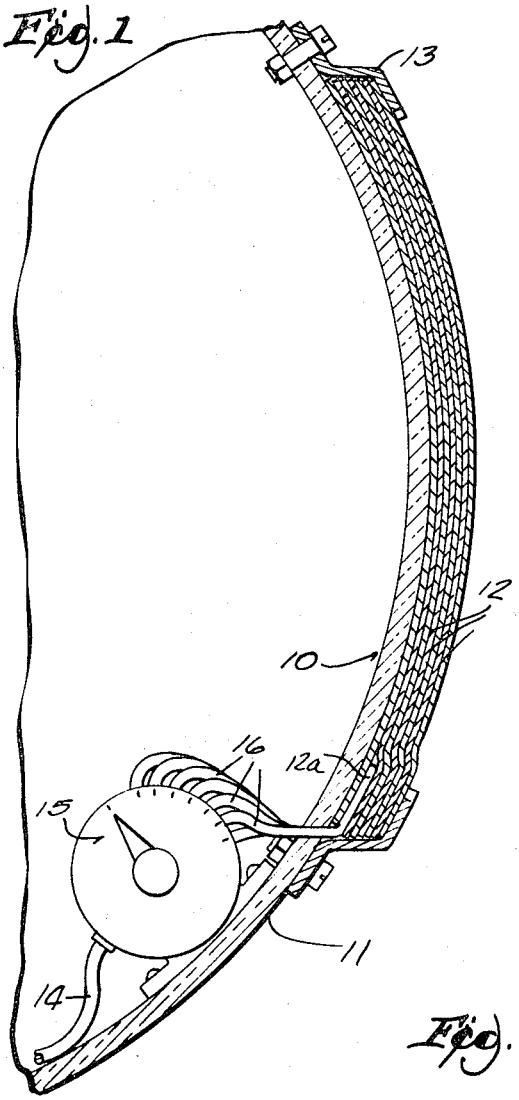
FIG. 1 is a vertical cross-sectional view taken through a portion of an aircraft windshield equipped with a protective device embodying the invention.
Figure 2:
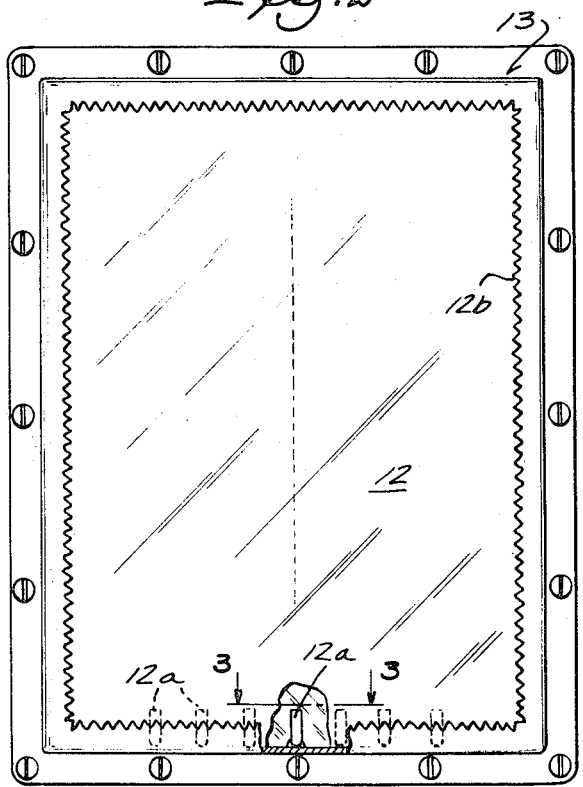
FIG. 2 is a front view in elevation of the device.
Figure 3:
FIG. 3 is a cross-sectional view taken on line 3—3 of FIG. 1.
Figure 4:
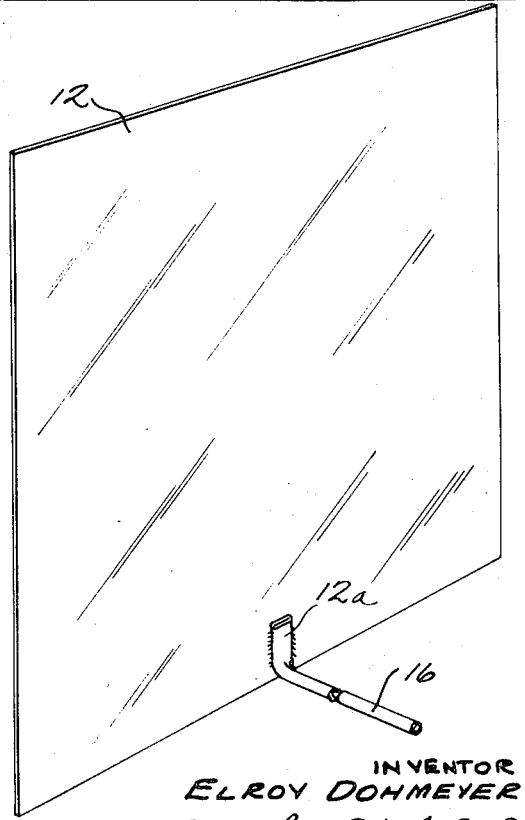
FIG. 4 is a perspective view of one flattened tube terminal and one of the transparent sheet elements.

Referring more particularly to the drawing, in FIG. 1 the plane windshield 10 is covered on a portion of the frontal surface thereof 11, by a plurality of flexible transparent elements 12, retained in place by the frame 13. A source of compressed air is admitted through conduit 14 to a numbered valve 15 by means of which it may be projected through any one of a plurality of conduits 16 successively.

Each conduit 16 communicates with a flattened hose terminal inserted behind or inside of a transparent element 12, each of which has a tear line adjacent continuously to the rectangular margins thereof.

In the event of the deposit of a swarm of insects on the windshield 10, the pilot adjusts the valve 15 to force a blast of air between the outermost transparency 12 and the next transparent element under it, thus tearing off the outermost layer carrying the insect deposit, thus restoring clear vision through the windshield to the pilot.

I claim:

1. A frame affixed to a portion of an aircraft windshield, a plurality of transparent sheet elements held in layer arrangement in said frame, tear lines continuously adjacent the margins thereof, saw teeth on the inner marginal edges of said frame, and means for divesting successive layers as needed when the latter are obscured by the deposit of insect swarms.

2. A device as in claim 1, and a rubber hose terminal held behind each transparent sheet adjacent one margin thereof, a compressed air source, and selector means for forcing compressed air through each hose to break away and divest its related transparent sheet.